United States Patent
Akiyama et al.

(10) Patent No.: US 7,983,633 B2
(45) Date of Patent: Jul. 19, 2011

(54) RADIO BASE STATION HAVING TRANSMITTERS CORRESPONDING TO A PLURALITY OF SECTORS, AND SIGNAL TRANSMISSION METHOD FOR A PLURALITY OF SECTORS

(75) Inventors: Chiyoshi Akiyama, Kawasaki (JP); Naoyuki Saitou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 916 days.

(21) Appl. No.: 11/984,156

(22) Filed: Nov. 14, 2007

(65) Prior Publication Data

US 2008/0153434 A1    Jun. 26, 2008

(30) Foreign Application Priority Data

Dec. 26, 2006    (JP) .................................. 2006-349991

(51) Int. Cl.
    *H04B 1/02* (2006.01)
(52) U.S. Cl. ...................................... 455/103; 375/267
(58) Field of Classification Search .................. 455/101, 455/102, 103, 550.1, 562.1; 375/260, 267, 375/347; 370/328, 332, 342, 345
    See application file for complete search history.

(56) References Cited

U.S. PATENT DOCUMENTS

| 6,021,166 | A | 2/2000 | Suzuki |
| 6,119,004 | A | 9/2000 | Yamada et al. |
| 7,379,477 | B2 * | 5/2008 | Oh et al. ........................ 370/345 |
| 2005/0201477 | A1 * | 9/2005 | Cho et al. ........................ 375/260 |
| 2005/0225805 | A1 | 10/2005 | Kato |
| 2005/0286462 | A1 * | 12/2005 | Roh et al. ........................ 370/328 |

FOREIGN PATENT DOCUMENTS

| JP | 10-164637 | 6/1998 |
| JP | 2002-345013 | 11/2002 |
| JP | 2005-528038 | 9/2005 |
| KR | 10-2005-0122665 | 12/2005 |
| WO | WO98/13956 | 4/1998 |

OTHER PUBLICATIONS

Intellectual Property Office of Korea, Office Action, "Notification of Preliminary Rejection" for corresponding Korean Patent Application No. 10-2007-126044; with a dispatch date of Aug. 4, 2009; English translation attached.

* cited by examiner

*Primary Examiner* — Thanh Le

(74) *Attorney, Agent, or Firm* — Myers Wolin, LLC.

(57) ABSTRACT

Circuit scale and power consumption of a base station is reduced with a feature of a sector-free configuration in routing processing. The feature is realized in a base station having transmitters corresponding to a plurality of sectors, as there are a switch distributing signals corresponding to a plurality of subcarriers to the plurality of sectors, respectively, and an inverse Fourier transform processor performing inverse Fourier transform processing on the signals for the plurality of sectors distributed by the switch, so as to supply to each corresponding transmitter among transmitters corresponding to the plurality of sectors.

7 Claims, 7 Drawing Sheets

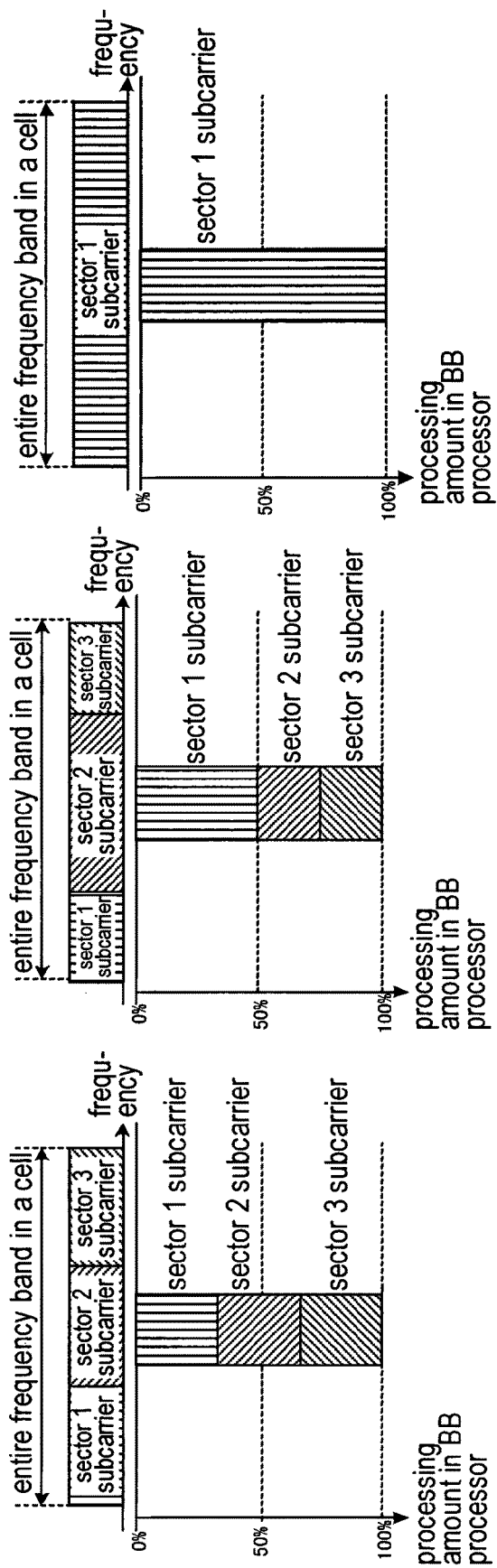

RADIO BASE STATION HAVING TRANSMITTERS CORRESPONDING TO A PLURALITY OF SECTORS, AND SIGNAL TRANSMISSION METHOD FOR A PLURALITY OF SECTORS

CROSS-REFERENCE TO RELATED APPLICATIONS

This application is based upon and claims the benefit of priority from the prior Japanese Patent Application No. 2006-349991, filed on Dec. 26, 2006, the entire contents of which are incorporated herein by reference.

BACKGROUND OF THE INVENTION

1. Field of the Invention

The present invention relates to radio equipment performing transmission and reception corresponding to a plurality of sectors. In particular, the present invention is preferably applied to realize a sector-free radio base station, in a cellular system employing OFDM and OFDMA. Here, sector-free signifies a state in which a PHY unit for generating a signal corresponding to each subcarrier can be shared among RF units corresponding to the plurality of sectors.

2. Description of the Related Art

There has been adopted a cellular system performing transmission and reception in one radio base station, with different frequencies assigned to a plurality of sector antennas.

For example, in the Domestic Republication of PCT Publication WO98/13956 (hereafter referred to as Patent document 1), there is shown a configuration including transmitter/receivers provided on each sector basis, baseband processors on each sector basis, and a switch for selecting the connection between the baseband processors and the transmitter/receivers.

Also, in the official gazette of the Japanese Unexamined Patent Publication No. Hei-10-164637 (hereafter referred to as Patent document 2), in a CDMA cellular mobile communication system, there is a description of dividing the service area of one cell base station into a plurality of sectors. Also, there is shown switchover control according to the movement of a mobile terminal, so as to select among transmission/reception antennas each serving an area corresponding to each of the plurality of sectors.

Further, in the official gazette of the Japanese Unexamined Patent Publication No. 2002-345013 (hereafter referred to as Patent document 3), there is shown sector transmission and reception, in which a cell covered by a radio base station is divided into a plurality of sectors respectively having an identical area. The above sector transmission/reception system has a feature that a cell includes a first area constituted of a predetermined number of sectors, and a second area being disposed inside the first area and constituted of sectors smaller in number than the above predetermined number, and further, there is disclosed a sector division method reducing processing amount for handover control.

Now, for communication systems in recent years represented by WiMAX (World Interoperability for Microwave Access) communication, large capacity and high speed have been required. As communication methods to realize such requirements, there are adopted OFDM (Orthogonal Frequency Division Multiplexing) and OFDMA (Orthogonal Frequency Division Multiple Access), having a feature of performing Fourier transform and inverse Fourier transform for transforming between a signal in the frequency domain and a signal in the time domain.

In the inventions described in the above Patent documents 1 to 3, although sector transmission/reception is disclosed, no guideline has been shown about the relation to be applied between distribution to sectors and the transformation processing such as Fourier transform and inverse Fourier transform.

SUMMARY OF THE INVENTION

Accordingly, from the above viewpoint, it is an object of the present invention to propose what relation is to be applied between the transformation processing, such as Fourier transform and inverse Fourier transform, and the distribution processing to sectors. Also, in another aspect, it is an object of the present invention to reduce circuit scale or power consumption.

In a first aspect of the present invention to achieve the aforementioned objects, a radio base station, having transmitters corresponding to a plurality of sectors, includes a switch for distributing signals corresponding to a plurality of subcarriers respectively for the plurality of sectors. Further, the radio base station includes an inverse Fourier transform processor, performing inverse Fourier transform processing on the signals for the plurality of sectors being distributed by the switch, so as to supply to each corresponding transmitter among the plurality of transmitters corresponding to the plurality of sectors.

In the above first aspect, the radio base station further includes a plurality of baseband processors, dividing the entire transmission frequency bands of one cell, and processing subcarrier component signals in a band assigned correspondingly to the plurality of sectors.

In the above first aspect, as a feature, the above inverse Fourier transform processor transforms the signals for the plurality of sectors being distributed by the switch into orthogonal frequency division multiplexed symbols in the time axis domain, correspondingly to the sectors.

Also, it may be possible to configure the radio base station having a null signal inserter for inserting a null signal when the signals distributed by the switch do not fill the band assigned to the corresponding sector, so as to generate a band signal for the assigned band.

Further, in the above first aspect, the radio base station includes a plurality of receivers corresponding to the plurality of sectors, respectively receiving the band signals divided and assigned corresponding to the plurality of sectors; and also, a Fourier transformer performing Fourier transform processing on the orthogonal frequency division multiplexed symbols in the time axis domain, being output from the plurality of receivers, on a basis of each of the plurality of sectors, so as to transform into subcarrier signal components. Further, the switch switches over the subcarrier signal components from the Fourier transformer on each subcarrier basis, assembles the band signals of the divided and assigned band, and distributes to a corresponding baseband processor among the plurality of baseband processors.

With the above-mentioned feature of the present invention, it is possible to perform the transformation processing such as Fourier transform and inverse Fourier transform in suitable relation to the distribution to the sectors.

Further, the circuit scale and the power consumption can be suppressed small. When the inverse Fourier transformer requires inputs by the number of subcarriers of a plurality N, even when the signals corresponding to the subcarriers being input through the switch relate to M subcarriers (M<N), null signals can be inserted as the inputs for the remaining (N−M) subcarriers. Therefore, even when the switch cannot assign the signals fully for N subcarriers to the inverse Fourier transformer, the inverse Fourier transform can be performed smoothly.

Thus, the degree of freedom in switching is increased, which is particularly convenient when sector-free operation is performed.

Further scopes and features of the present invention will become more apparent by the following description of the embodiments with the accompanied drawings.

BRIEF DESCRIPTION OF THE DRAWINGS

FIGS. 7A to 7C show diagrams illustrating each baseband processing amount in the embodiments to which the present invention is applied.

DETAILED DESCRIPTION OF THE PREFERRED EMBODIMENTS

The preferred embodiment of the present invention is described hereinafter referring to the charts and drawings.

Figure 1:
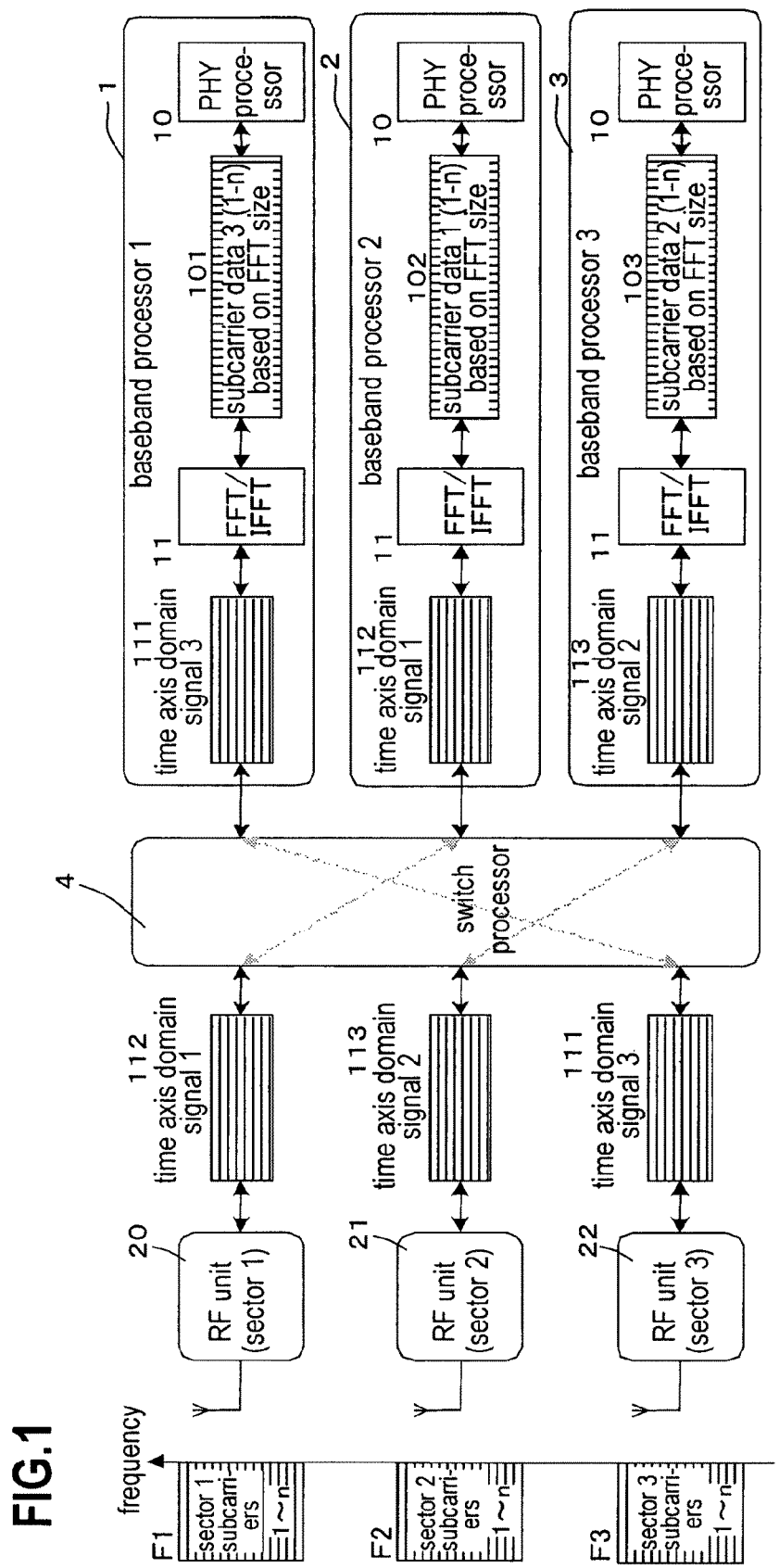
FIG. 1 shows a diagram illustrating a base station unit, which is an example for comparison having been studied in the process of realizing the present invention.

FIG. 1 shows a configuration of radio equipment (for example, a radio base station in WiMAX) of a sector structure, illustrating a case of Fourier transformers and inverse Fourier transformers being disposed on the side of PHY processors (processors for generating signals corresponding to subcarriers) relative to a switch.

In FIG. 1, transmission processing is described first.

Each subcarrier data 101, 102, 103 modulated in a modulation/demodulation function (PHY) processor 10 of each baseband processor 1, 2, 3 is IFFT (inverse Fourier transform) processed in an FFT (Fourier transform)/IFFT (inverse Fourier transform) circuit 11, so that the signal in the frequency domain is transformed into each signal (signal on the time axis) 111, 112, 113 in the time domain.

A switch 4 performs switching processing to distribute signal 111-113 on the time axis to each corresponding sector unit.

A radio frequency (RF) unit in each sector 20, 21, 22 transmits each signal 111-113 on the time axis being input from switch 4 in each different carrier frequency band F1, F2, F3.

In FIG. 1, reception processing is reverse to the above processing.

As described above, in the configuration shown in FIG. 1, because FFT/IFFT 11 is disposed on the PHY side relative to switch 4, band assignment to each sector 20, 21, 22 has one-to-one correspondence to each baseband processor 1, 2, 3.

Therefore, although the relation of correspondence between baseband processor 1, 2, 3 and sector 20, 21, 22 can be modified, it is difficult to conduct a process such as generating of a signal to be transmitted in one of sectors 20, 21, 22 by different two baseband processors.

Figure 2:
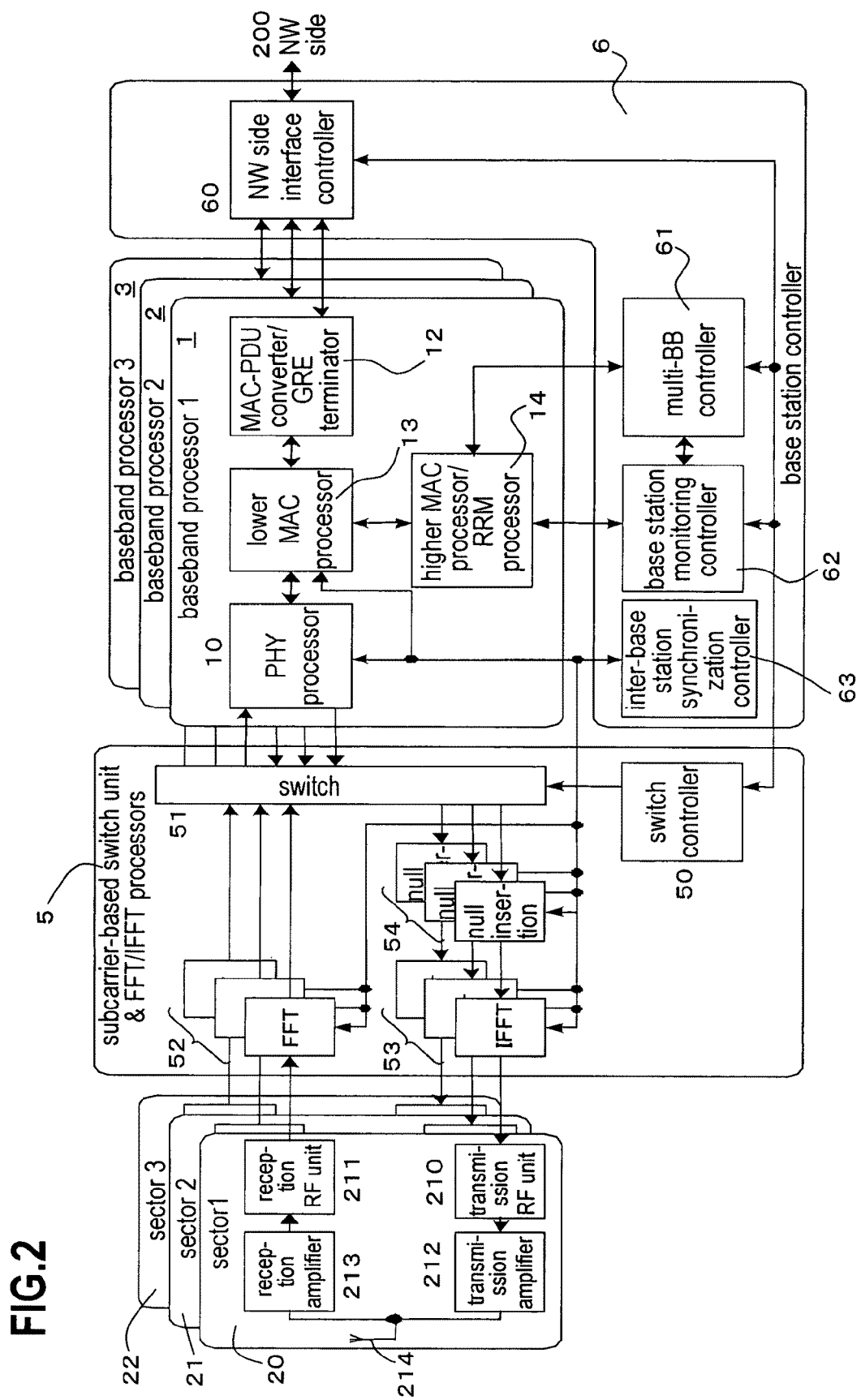
FIG. 2 shows a configuration block diagram of a base station unit in which the present invention is applied.

FIG. 2 shows a configuration block diagram of a base station unit in another embodiment. Here, an FFT 52 and an IFFT 53 are disposed on the opposite side to a PHY processor 10 relative to a switch 51. Additionally, the base station unit may be considered as a radio base station corresponding to WiMAX, similar to the foregoing description.

The configuration shown in FIG. 2 is an exemplary configuration when the interface of a ground network (NW) 200 is formed of an IP network. A base station controller 6 is configured of NW side interface controller 60, multi-baseband (BB) controller 61, base station monitoring controller 62, and inter-base station synchronization controller 63. Additionally, when the interface of ground network (NW) 200 is a general subscriber line or the like, the interface is different depending on the subscriber line or the like, concerned. Each baseband processor 1, 2, 3 is configured of MAC-PDU converter/GRE terminator 12, higher MAC processor/RRM processor 14, lower MAC processor 13, and PHY processor 10.

Subcarrier-based switch unit 5 is configured of a switch controller 50 for controlling switchover of sectors on each subcarrier basis, switch 51 for performing switchover of sectors on each subcarrier basis according to the control data of switch controller 50, FFT/IFFT processors 52, 53, and a null inserter 54.

A radio frequency (RF) unit provided on the basis of each sector 20, 21, 22 includes transmission and reception RF units 210, 211, transmission and reception amplifiers 212, 213, and an antenna 214. By use of FIG. 2, the principle of the basic operation according to the present invention will be described below.

PHY processor 10 in each baseband processor 1, 2, 3, modulates and demodulates subcarrier data over a plurality of sectors, by the unit equivalent to each processing size (for the number of subcarriers) in FFT processor 52 and IFFT processor 53 disposed in the latter stage.

Here, it is sufficient if each PHY processor 10 generates a modulation data in such a way that the number of subcarriers included in each data after being distributed by switch unit 5 coincides with the processing size in FFT/IFFT processor 52, 53, as a whole. The processing is conducted in a uniform manner, even if a processing amount deviates. For example, the data output from baseband processor 1 is distributed to the entire sectors, while baseband processors 2, 3 may be allowed to have a situation such that the output data thereof are distributed only to sectors 2, 3, respectively.

In case of downlink, before performing IFFT processing for each sector 20, 21, 22, switching is performed in subcarrier-based switch unit 5, on each subcarrier basis. With this, it becomes possible to realize sector-free flexibility on each subcarrier basis.

Figure 3:
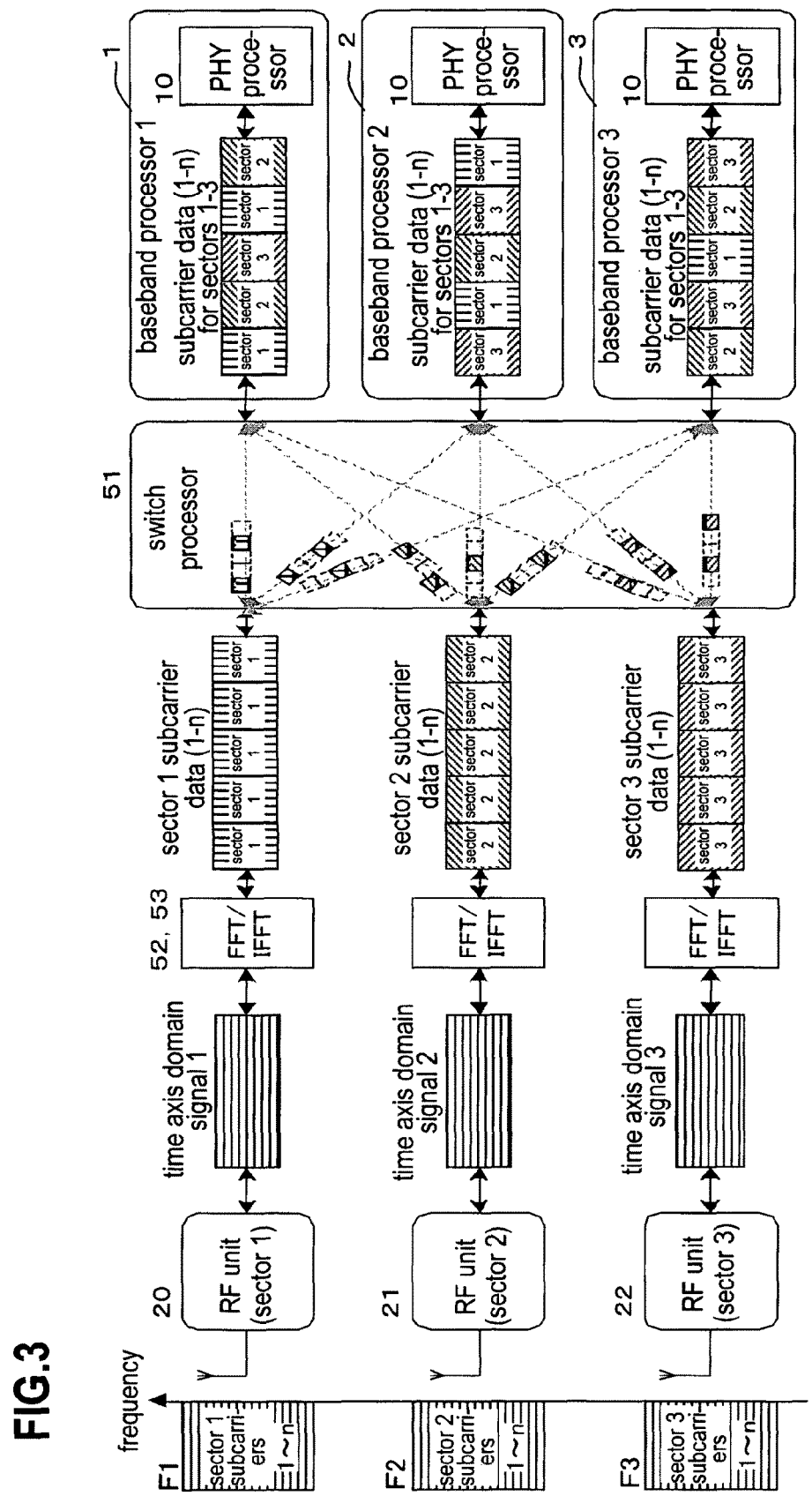
FIG. 3 shows a diagram illustrating a basic operation principle of the present invention.

Referring to FIG. 3, signals 1-n corresponding to subcarriers (signals corresponding to subcarrier components) being output from each PHY processor 10 in baseband processors 1, 2, 3 include not only for one sector but for a plurality of sectors. In particular, in the above example, the data output from each baseband processor 1-3 include subcarrier data corresponding to the entire sectors 20, 21, 22.

For example, in baseband processor 1, subcarrier data are processed and output in the order of sectors 1-2-3-1-2. In baseband processor 2, subcarrier data are processed and output in the order of sectors 3-1-2-3-1. Further, in baseband processor 3, subcarrier data are processed and output in the order of sectors 2-3-1-2-3.

In switch unit 5 commonly connected to the plurality of baseband processors 1, 2, 3 and the plurality of sectors 20, 21, 22, each subcarrier component signal for each sector is distributed. IFFT processor 53 in each sector transforms the subcarrier component signal after the distribution into a time axis domain signal, and transfers to transmission RF unit 210 for each sector.

Additionally, in the above example, it is assumed that the entire subcarrier signals necessary for transformation processing are input into IFFT processor 53. For example, when the IFFTs corresponding to sectors 1-3 require L, M, N subcarriers (L=M=N may be allowed), respectively, at the time of transformation, desirably, the number of subcarriers assigned to each sector 1-3 after switching is to be L, M, N.

Figure 4:
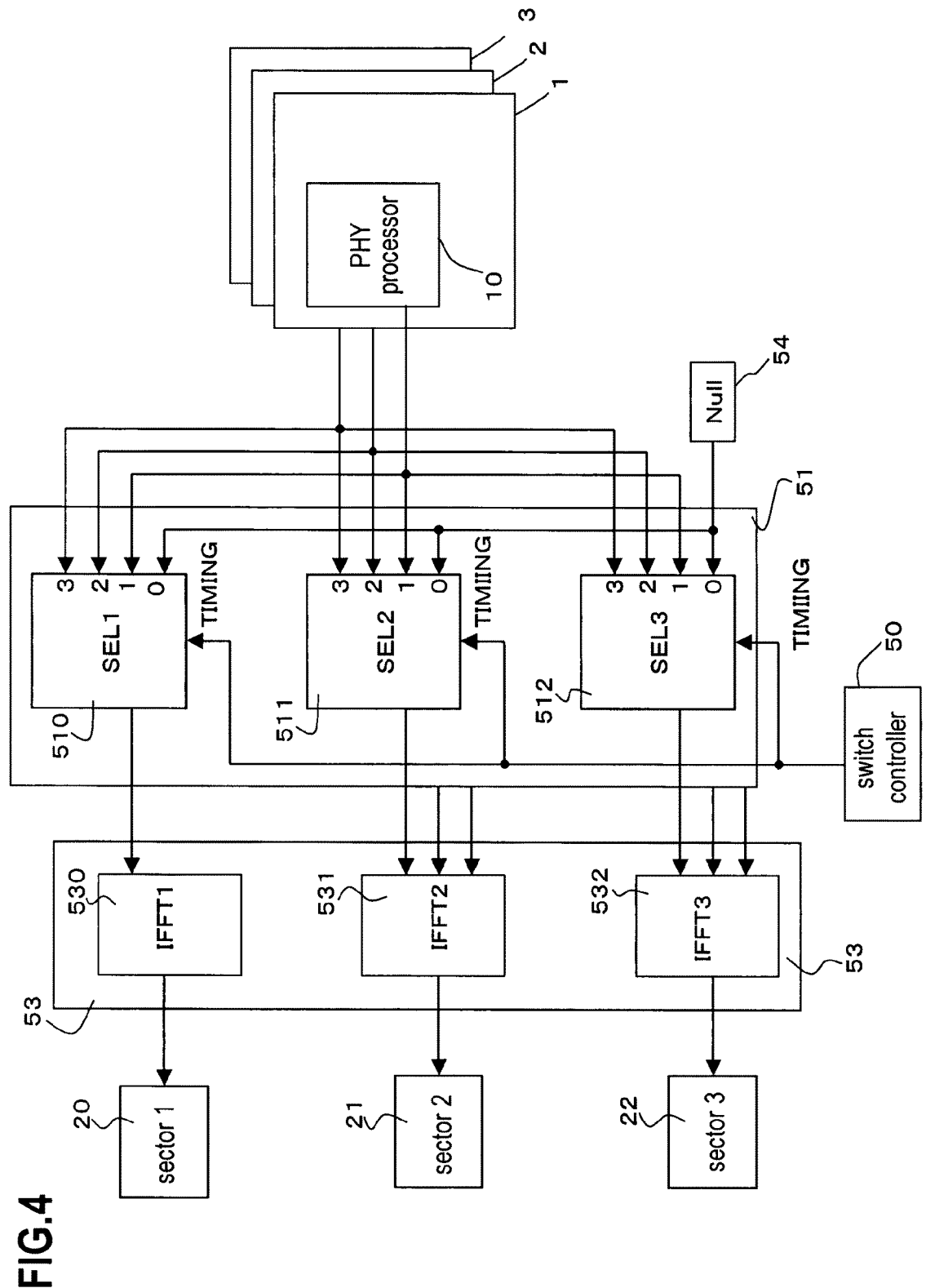
FIG. 4 shows a diagram illustrating exemplary configurations of a switch in a subcarrier-based switch unit, and a switch controller.

FIG. 4 shows a diagram illustrating exemplary configurations of switch 51 in subcarrier-based switch unit 5, and switch controller 50.

Here, the example concerned has a configuration capable of handling a case when the data distributed by switch unit 5 include a small number of subcarriers as compared to the IFFT size.

Switch 51 includes three switch units 510, 511, 512 respectively corresponding to baseband processors 1, 2, 3, and each switch unit (the switch unit corresponding to baseband processor 1 is shown in FIG. 4) includes selectors 510, 511, 512 corresponding to the number of sectors (three sectors as an exemplary embodiment).

Each selector 510, 511, 512 includes input terminal #0, and #1, #2, #3. To each input terminal #1, #2, #3, the output of each corresponding baseband processor 1, 2, 3 is connected. To the input terminal #0, a logical "0" signal is supplied from a null inserter 54. The reason is that, when the number of subcarriers included in the data distributed by switch unit 5 is small compared to the IFFT size, null data are inserted into the distributed data, so as to satisfy the IFFT size.

The null insertion amount can be adjusted to fill the gap between the IFFT size and the number of subcarriers included in each distributed data.

Further, from switch controller 50, a timing signal is supplied to each selector 510, 511, 512. When the above timing signal is supplied, the input terminal #1, #2 or #3 is enabled to select an output from baseband processor 1, 2, 3.

Also, when the output from baseband processor 1, 2, 3 is not selected, null inserter 54 inserts a logical "0" by enabling the input terminal #0, corresponding to synchronization timing from inter-base station synchronization controller 63 (refer to FIG. 2).

Switch controller 50 is connected to base station monitoring controller 62 and interface controller 60 (refer to FIG. 2), and generates switchover timing based on the destination information of downlink subcarrier data, so as to supply timing signals to selector 510, 511, 512.

The outputs of three selectors 510, 511, 512 in switch 51 are input into IFFT processor 53. IFFT processor 53 includes IFFT processing circuits 530, 531, 532 respectively corresponding to selectors 510, 511, 512. IFFT processor 53 executes IFFT processing on the output of baseband processor 1, 2, 3 on each sector basis, and outputs the output thereof to the corresponding sector 20, 21, 22.

According to the above configuration, even when subcarrier assignment is modified with regard to the subcarrier data generated in PHY processor 10, null data are appropriately inserted. Thus, it is possible to satisfy the IFFT size (preferably, the transmission bandwidths of sectors 1-3, i.e. the entire transmission bandwidths), which is suitable to realize sector-free.

Figure 5:
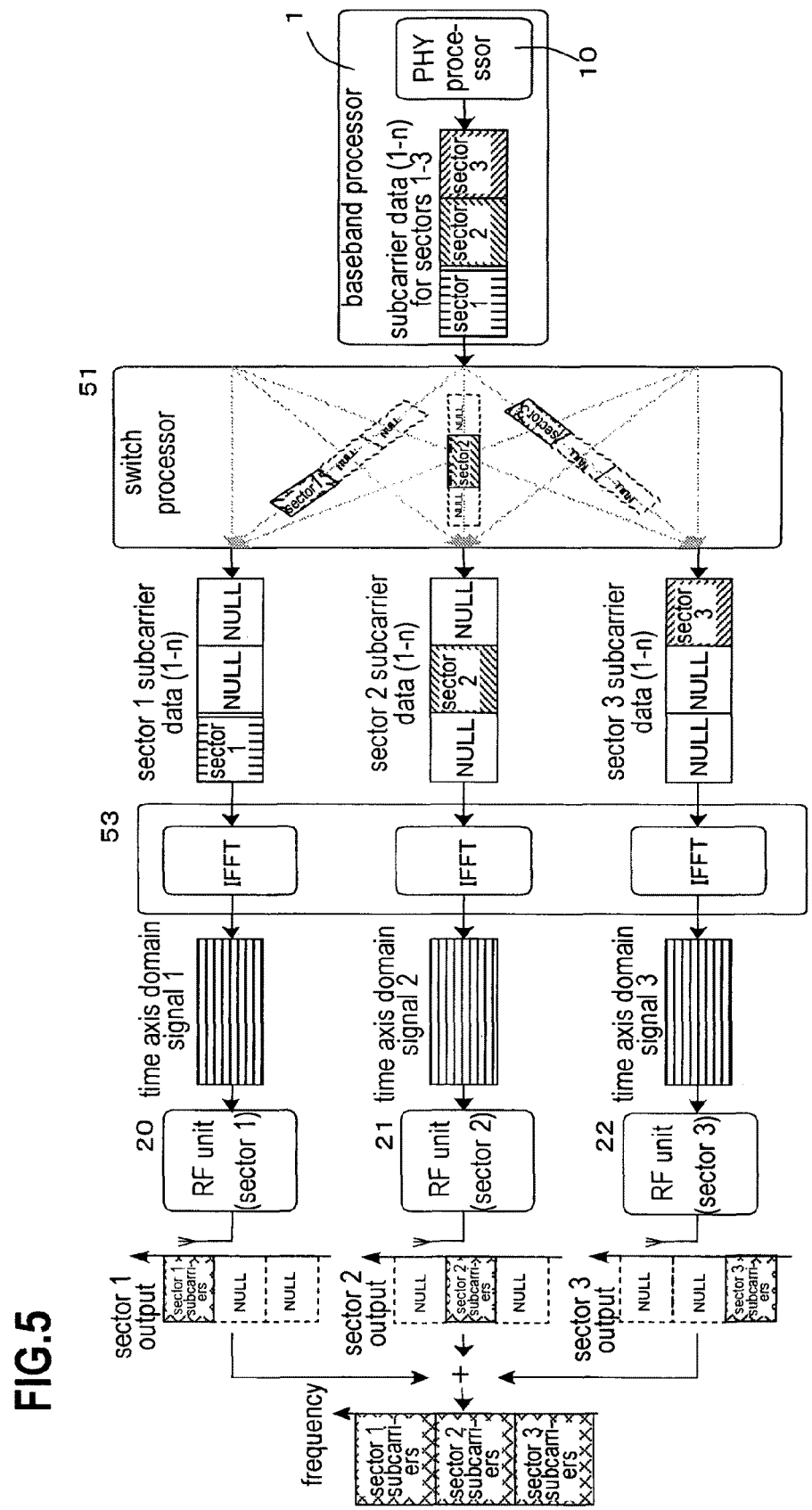
FIG. 5 shows a diagram illustrating the operation of an embodiment in a downlink according to the present invention, when the entire cell bandwidths are divided into a plurality of sectors, so that a few frequency bands are assigned.

FIG. 5 shows a diagram illustrating the operation of an embodiment in the downlink according to the present invention, when the entire transmission bands of a cell are divided (into three, for example), and each divided transmission band is assigned to each sector.

Here, in the figure, only one unit of baseband processor 1 is illustrated, and the signal corresponding to the subcarrier being output from the above one unit is distributed to each sector, by means of switch 51, so as to generate a signal to be transmitted in each bandwidth. Also, when the signals distributed by switch 51 correspond to M subcarriers, the number of subcarriers N required for the processing in IFFT 53 is not satisfied, but null data as many as the number of subcarriers N−M are inserted into the input data into the IFFT after the distribution.

Namely, in switch 51 of switch unit 5 capable of distributing data on each subcarrier basis, the subcarrier data, on which PHY processor 10 performs modulation/demodulation processing, are distributed to each sector, and transferred to IFFT processor 53.

Desirably, the IFFT size in each sector is to be set large enough to cope with the frequency bands having possibility of assignment to each sector (the entire transmission frequency bands assigned to the cell, for example). However, in some cases, the data distributed by switch 51 may include only data corresponding to the number of subcarriers smaller than the IFFT size (number of subcarriers).

In such cases, by inserting null data (subcarrier signal indicative of null) into the data distributed by switch unit 5, the IFFT size is satisfied.

In IFFT processor 53, a subcarrier data signal with null inserted therein depending on necessity is transformed into a time axis domain signal, and radiated to the space through the RF unit of each sector 20, 21, 22.

The signal radiated from the RF unit of each sector 20, 21, 22 is multiplexed in the air, and becomes a signal having a predetermined band of one cell.

As such, according to the present invention, PHY processor 10 in baseband processor 1, 2, 3 can be shared by the plurality of RF units. Particularly in the above example, it is possible for one baseband processor 1 to generate signals to be transmitted through the entire three sectors. Needless to say, when null insertion is required, null signals are inserted separately.

Figure 6:
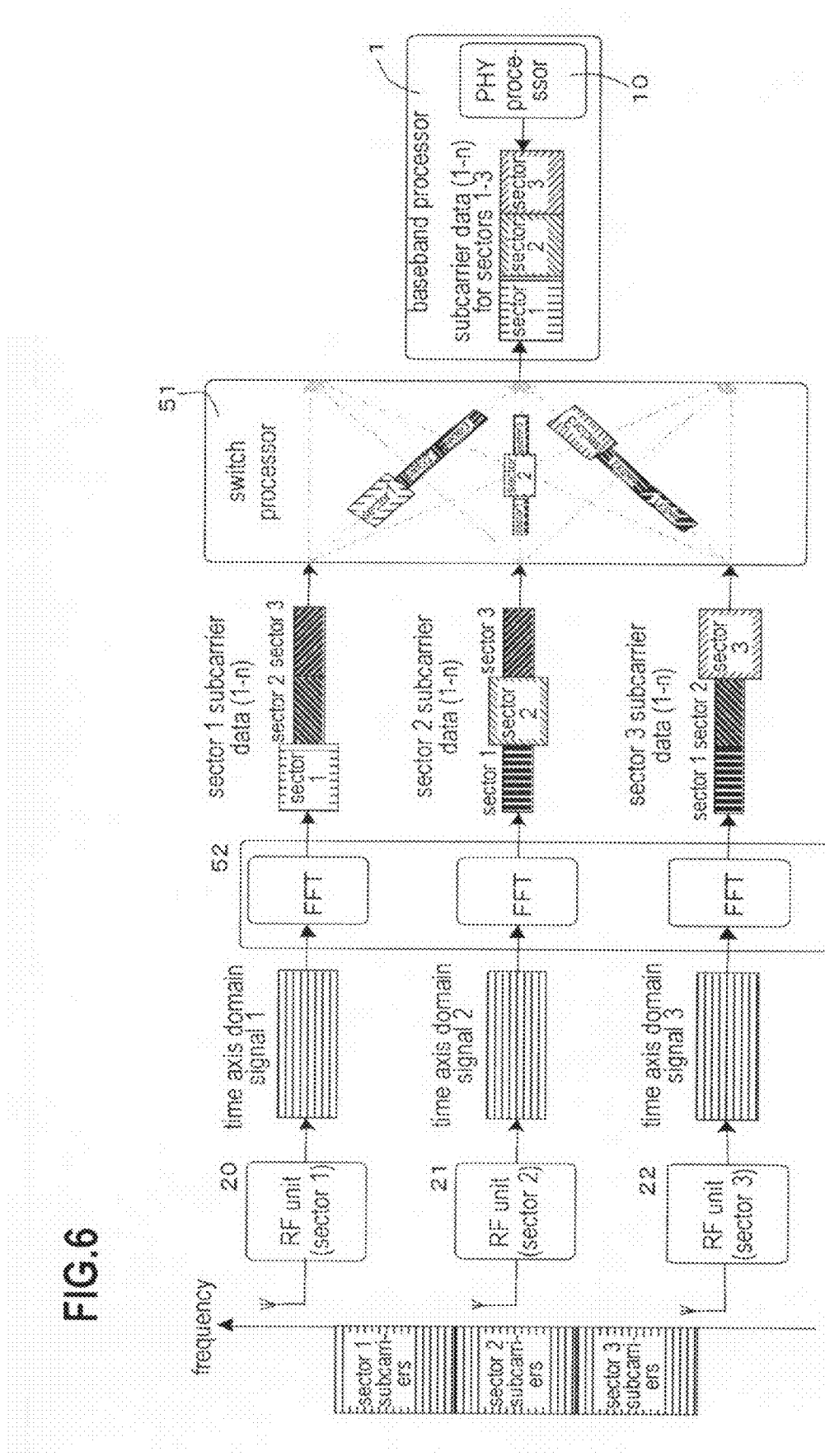
FIG. 6 shows a diagram illustrating the operation of a radio base station in an uplink to which the present invention is applied.

Next, the processing in case of uplink is described. FIG. 6 shows a diagram illustrating the operation of a radio base station in the uplink, to which the present invention is applied.

In FIG. 6, as an embodiment, a modulation wave of three sectors multiplexed in the air is received and amplified in reception amplifiers 213 (FIG. 2) of sectors 20, 21, 22. Subsequently, in reception RF units 211 (FIG. 2), each subcarrier signal in the frequency band corresponding to each sector is demodulated, and output as a time axis domain signal.

Through the Fourier transform in FFT processor 52, the time axis domain signal becomes a subcarrier baseband data corresponding to each sector.

The above signal is switched on each subcarrier basis in switch 51 of subcarrier-based switch unit 5. With this, PHY processor 10 in each baseband processor 1, 2, 3 can perform subcarrier data processing over a plurality of sectors. Thus, sector-free flexibility on each subcarrier basis can be realized.

For example, FFT processor 52 transforms the time axis domain signal received in the RF unit of each baseband processor 20, 21, 22, sector by sector, into a subcarrier signal.

Then, switch 51 assembles the subcarrier signal assigned to each baseband processor 1, 2, 3, and transfers to each corresponding baseband processor. FIGS. 7A to 7C show diagrams illustrating each baseband processing amount in baseband processors 1, 2, 3 according to the embodiment as described above, to which the present invention is applied.

FIG. 7A shows a diagram illustrating each baseband processing amount in three baseband processors 1, 2, 3, when the entire frequency bands in one cell are divided uniformly, and assigned to three sectors.

FIG. 7B shows a diagram illustrating each baseband processing amount in three baseband processors 1, 2, 3, when the entire frequency bands in one cell are assigned ununiformly to three sectors.

FIG. 7C shows a diagram illustrating a baseband processing amount in baseband processor 1, when the entire frequency bands in one cell are assigned to only one sector.

In any cases, operation is performed with a processing amount to the entire frequency band of the cell, and it is understood that a waste in equipment scale to the processing amount is not produced.

As described above, in OFDM communication, the present invention performs switching processing between the FFT/IFFT processor and the baseband processor, to attain a sector-free structure. With this, switching (routing) on each subcarrier basis can be performed, which enables one baseband processor 10 to perform baseband processing for a plurality of sectors.

By applying the sector-free method in the OFDM cellular system, switching of sectors on each subcarrier basis can be attained, and accordingly, a more flexible sector-free structure can be realized.

With this, in case a handover between sectors occurs, as compared to the configuration shown in FIG. 1, it is possible to avoid a shift between PHY processors even when a shift between sectors occurs because of the occurrence of the handover, by switching the sectors on a subcarrier basis. Thus, processing becomes simplified, and a compact equipment structure can be attained, which greatly contributes to cost reduction.

Further, although the OFDM communication system has been exemplified in the above explanation of the embodiments, the application of the present invention is not limited thereto.

Namely, based on the basic principle of the present invention, applications to an OFDMA (Orthogonal frequency Division Multiple Access) communication system and an SOFDMA (Scalable Orthogonal frequency Division Multiple Access) communication system are also possible.

Also, it is possible to apply to a multicarrier system. Further, it is possible to apply to the structures for reception diversity and transmission diversity.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A radio base station having transmitters corresponding to a plurality of sectors, comprising:
    a baseband processor performing base band processing on signals for the plurality of sectors;
    a switch distributing signals corresponding to a plurality of subcarriers respectively for the plurality of sectors; and
    a plurality of inverse Fourier transform processors, each of which performs inverse Fourier transform processing on the signals for a corresponding sector, which are distributed by the switch, and supplying the signals on which the inverse Fourier transform processing is performed to each corresponding transmitter among the plurality of transmitters corresponding to the plurality of sectors.

2. The radio base station according to claim 1, further comprising:
    a plurality of baseband processors dividing the entire transmission frequency bands of one cell, and processing subcarrier component signals in a band assigned correspondingly to the plurality of sectors.

3. The radio base station according to claim 1, wherein the inverse Fourier transform processor transforms the signals for the plurality of sectors being distributed by the switch into orthogonal frequency division multiplexed symbols in the time axis domain, correspondingly to the sectors.

4. The radio base station according to claim 1, further comprising:
    a null signal inserter inserting a null signal when the signals distributed by the switch do not fill the band assigned to the corresponding sector, so as to generate a band signal for the assigned band.

5. The radio base station according to claim 1, further comprising:
    a plurality of receivers corresponding to the plurality of sectors, respectively receiving the band signals divided and assigned corresponding to the plurality of sectors; and
    a Fourier transformer, performing Fourier transform processing on the orthogonal frequency division multiplexed symbols in the time axis domain, being output from the plurality of receivers, on a basis of each of the plurality of sectors, so as to transform into subcarrier signal components,
    wherein the switch switches over the subcarrier signal components from the Fourier transformer on each subcarrier basis, assembles the band signals of the divided and assigned band, and distributes to a corresponding baseband processor among the plurality of baseband processors.

6. The radio base station according to claim 1, further comprising:
    a null signal inserter inserting null signals respectively to the signals for the plurality of sectors being distributed by the switch,
    wherein, based on the signal having the null signal inserted therein, the inverse Fourier transform processor respectively performs inverse Fourier transform processing, so as to supply to each corresponding transmitter among the plurality of transmitters corresponding to the plurality of sectors.

7. A signal transmission method for a plurality of sectors in a radio base station, comprising:
    distributing signals corresponding to a plurality of subcarriers respectively for a plurality of sectors;
    inserting a null signal to the distributed signals for the plurality of sectors;
    performing inverse Fourier transform processing on the signals to which the null signal is inserted; and
    supplying the signals, on which the inverse Fourier transform processing is performed, to a transmitter for a corresponding sector.

* * * * *